United States Patent
Kristoffersen et al.

(10) Patent No.: US 9,563,543 B2
(45) Date of Patent: Feb. 7, 2017

(54) TEST FRAMEWORK EXTENSION FOR TESTING LOGIC ON A MODELED USER INTERFACE

(75) Inventors: Esben Nyhuus Kristoffersen, Dyssegaard (DK); Lars Hammer, Frederiksberg (DK)

(73) Assignee: Microsoft Technology Licensing, LLC, Redmond, WA (US)

( * ) Notice: Subject to any disclaimer, the term of this patent is extended or adjusted under 35 U.S.C. 154(b) by 634 days.

(21) Appl. No.: 13/173,104

(22) Filed: Jun. 30, 2011

(65) Prior Publication Data

US 2013/0007519 A1    Jan. 3, 2013

(51) Int. Cl.
*G06F 11/28* (2006.01)
*G06F 11/36* (2006.01)

(52) U.S. Cl.
CPC ....... *G06F 11/3688* (2013.01); *G06F 11/3696* (2013.01)

(58) Field of Classification Search
CPC .................................. G06F 9/44; G06F 8/38
USPC .................................................. 717/124, 125
See application file for complete search history.

(56) References Cited

U.S. PATENT DOCUMENTS

| | | | |
|---|---|---|---|
| 5,600,789 A * | 2/1997 | Parker et al. | 714/38.11 |
| 6,701,514 B1 * | 3/2004 | Haswell et al. | 717/115 |
| 7,584,416 B2 * | 9/2009 | Beran et al. | 715/222 |
| 7,685,576 B2 | 3/2010 | Hartmann et al. | |
| 7,702,499 B1 * | 4/2010 | Lavagno | G06F 11/3612 703/27 |
| 2004/0061714 A1 * | 4/2004 | Sinclair et al. | 345/705 |
| 2006/0026506 A1 | 2/2006 | Kristiansen et al. | |
| 2007/0083854 A1 * | 4/2007 | Mayer-Ullmann et al. | 717/124 |
| 2007/0198940 A1 * | 8/2007 | Beran | G06F 9/4443 715/762 |
| 2007/0220347 A1 * | 9/2007 | Kirtkow et al. | 714/38 |
| 2008/0155515 A1 * | 6/2008 | Stewart | 717/135 |
| 2008/0168096 A1 | 7/2008 | Daskal et al. | |
| 2010/0333072 A1 | 12/2010 | Dulip et al. | |

OTHER PUBLICATIONS

Vieira, et al., Abstract entitled "Automation of GUI Testing Using a Model-Driven Approach," published May 23, 2006; pp. 9-14; 6 pages. Obtained at: http://www.irisa.fr/lande/lande/icse-proceedings/ast/p9.pdf.

(Continued)

*Primary Examiner* — Wei Zhen
*Assistant Examiner* — Brahim Bourzik
(74) *Attorney, Agent, or Firm* — Thomas R. Marquis; Kate Drakos; Micky Minhas

(57) ABSTRACT

A testing framework extension may be provided. An application comprising a form may be created within a modeling framework. A variable associated with the form may be defined and an application programming interface (API) may be created according to the form. A test case may be efficiently executed without rendering a physical UI using the variable by making at least one call to the API thus exercising (at least one part of) the form logic and a result of executing the test case may be reported to a user.

16 Claims, 3 Drawing Sheets

(56) References Cited

OTHER PUBLICATIONS

Bowen, et al., Proceedings entitled "UI-Design Driven Model-Based Testing," Presented at the Third International Workshop on Formal Methods for Interactive Systems (FMIS 2009), Electronic Communications of the EASST, vol. 22, 2009, 16 pages. Obtained at: http://journal.ub.tu-berlin.de/index.php/eceasst/article/view/314/311.

Benz, Sebastian, Abstract entitled "Combining Test Case Generation for Component and Integration Testing," published 2007, 11 pages. Obtained at: http://www.bmw-car-it.de/common/pdf/2007/amost07_benz_final.pdf.

McCaffrey, James, Article entitled "Web UI Automation with Windows PowerShell" published Mar. 2008; 10 pages. Obtained at: http://msdn.micro soft.com/en-us/magazine/cc337896.aspx.

Website entitled "Model-View-Controller" retrieved Mar. 25, 2011. Obtained at: http://msdn.microsoft.com/en-us/library/ff649643.aspx.

Adzic, "How to implement UI testing without shooting yourself in the foot" Apr. 13, 2010, 7 pages, retrieved at: https://gojko.net/2010/04/13/how-to-implement-ui-testing-without-shooting-yourself-in-the-foot-2/.

* cited by examiner

TEST FRAMEWORK EXTENSION FOR TESTING LOGIC ON A MODELED USER INTERFACE

BACKGROUND

A test framework extension may be provided. User interface (UI) development, like most software development, often requires rigorous testing prior to release. In conventional systems, testing application logic associated with a user interface requires a great deal of automation overhead in order to simulate a user's actions within the user interface. For example, some situations may involve a separate testing framework designed to interact with the actual UI elements. Such a testing framework exposes an Application Programming Interface (API) to the actual UI elements, and the test code needs to assume the existence of each element, which is often realized by transforming the form definition to get a strongly typed programming model for the test code. Further, logic is often coupled to UI elements, complicating attempts to separately test the UI functionality and the back end business logic. Thus, conventional testing is often slow and error prone, with test cases written against a physically rendered UI rather than the critical logic.

SUMMARY

This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

A testing framework extension may be provided. An application comprising a form may be created within a modeling framework. A variable associated with the form may be defined and an application programming interface (API) may be surfaced according to the form. A test case may use the variable by making at least one call to the API and a result of executing the test case may be reported to a user.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
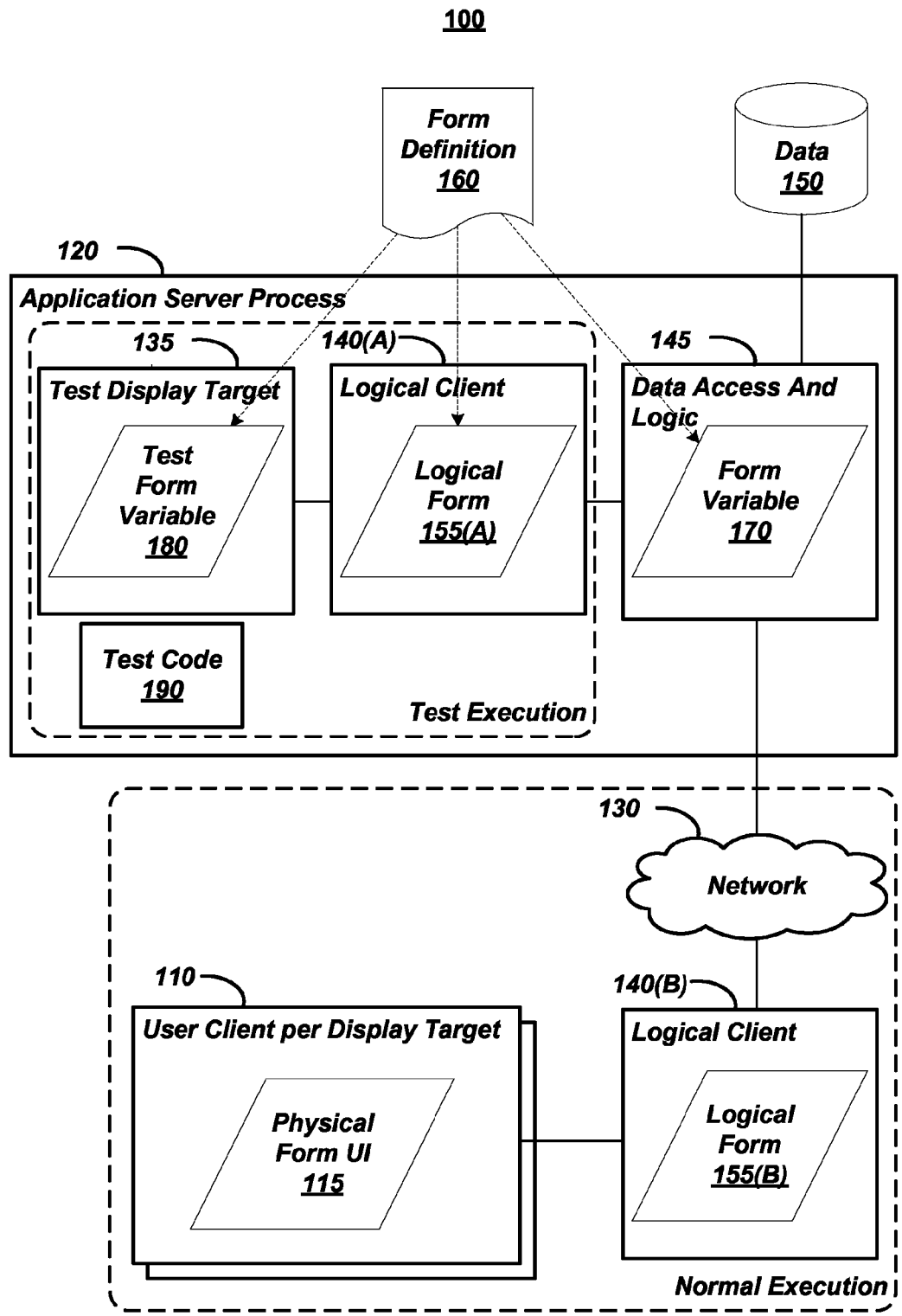
FIG. 1 is a block diagram of an operating environment.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

A development environment, such as the Microsoft® Dynamics NAV Client/Server Integrated Development Environment (C/SIDE), may allow tests to be written against a model of a form. A test form may be declared based on a modeled form that may access controls, actions, elements, etc. on the real form. The test form may also perform data-navigation (e.g., moving to a next row, apply search filters, etc.). The tests written in this framework may be validated (i.e., compile-checked) against the model when compiled. A runtime component (e.g., on a Microsoft® Dynamics NAV server) may utilize a logical client to create a non-visual, in-process form runtime that the test can be executed against.

FIG. 1 is a block diagram of an operating environment 100 comprising a plurality of user clients 110 and an application server process 120. User clients 110 may be coupled to application server process 120 via a network 130. User clients 110 may each be associated with different display targets (e.g., different display devices, hardware, and/or rendering methods). Network 130 may comprise, for example, an IP-based network, such as a corporate Local Area Network and/or a public network such as the Internet. Application server process 120 may comprise application and/or service software such as a test display target 135, a first logical client instance 140(A), and a data access and logic module 145. Application server process 120 may be operative to access data stored outside the process, such as application data stored in a database 150 and/or a form definition 160. Application server process 120 may further comprise a plurality of test code 190. Consistent with embodiments of the invention, a second logical client instance 140(B) may be provided for plurality of user clients 110. Test display target 135 and/or plurality of user clients 110 may be operative to interact with form and/or business-logic served by application server process 120 through a first logical form instance 155(A) and/or a second logical form instance 155(B) provided by logical client instances 140(A)-(B), respectively. Data access and logic module 145 may be operative to handle requests for retrieving data from and/or storing data to database 150 and for executing business logic. Logical client instance 140(B) may bridge between data access and logic module 145, which may host form variable 170 and provide data access and business logic execution, and plurality of display targets 110 running out-of-process and rendering a physical form UI 115. Logical client instance 140(A) may also bridge between data access and logic module 145 and test display target 135, which may host a test form variable 180. Test display target 135 may in turn be used by plurality of test code 190 executed inside application server process 120. Logical client instance 140(A) may create an instance of logical form 155(A) representing a display-technology-agnostic version of the form according to form definition 160. Under normal execution, logical client instance 140(B) may run outside of application server process 120, across the network 130 and may keep form variable 170 and physical form UI 115 synchronized, such that retrieved data and the effect of executing logic is propagated from form variable 170 to physical form UI 115 for the end-user to view, and such that data entered and actions invoked by the end user are propagated from physical form UI 115 to form variable 170 for data access and logic module 145 to further process. Under execution of test code 190, logical client instance 140(A) may execute inside application server process 120 and user client 110 may be replaced by test display target 135. Synchronization may then be performed between form variable 170 and test form variable 180, such that retrieved data and the effect of executing logic may be propagated from form variable 170 to test form variable 180 for the test code to inspect and validate, and such that data entered and actions invoked by the test code are propagated from test form variable 180 to form variable 170 for data access and logic module 145 to further process.

Figure 2:
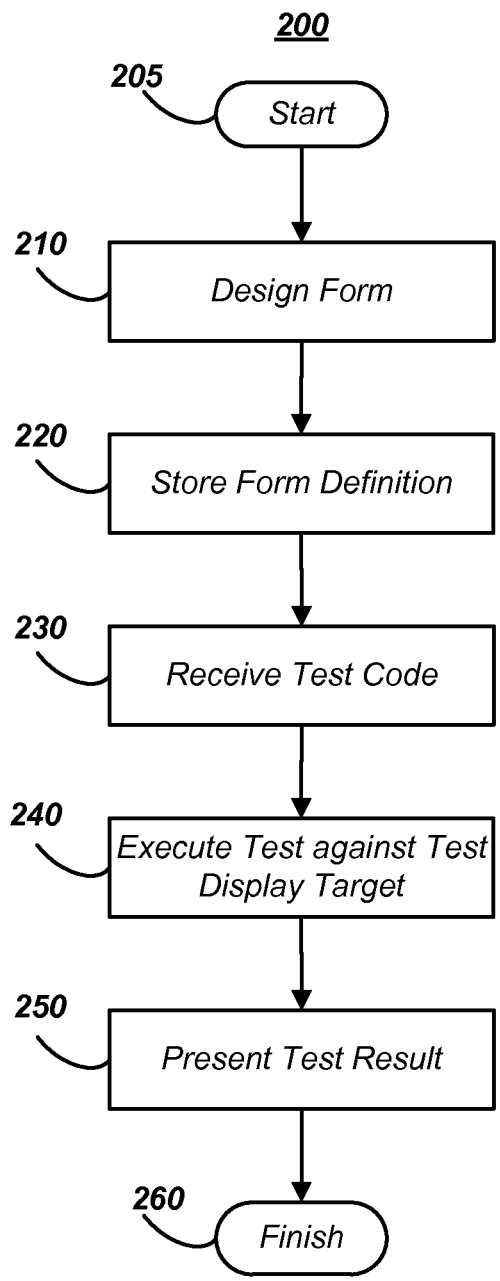
FIG. 2 is a flow chart of a method for providing a testing framework.

FIG. 2 is a flow chart setting forth the general stages involved in a method 200 consistent with an embodiment of the invention for providing a testing framework extension. Method 200 may be implemented using a computing device 300 as described in more detail below with respect to FIG. 3. Ways to implement the stages of method 200 will be described in greater detail below. Method 200 may begin at starting block 205 and proceed to stage 210 where computing device 300 may create a form within a modeling framework. For example, computing device 300 may receive a form definition for an application such as a web-based application designed within a modeling framework by a developer. The application may comprise a plurality of control elements associated with the form and a plurality of logic functions. For example, the application form may comprise a text entry for a credit card number, shipping address, etc. Example logic functions may comprise functions to verify the entered shipping address is valid, process the credit card number, and/or pre-populate fields of the form according to a user's login information. These logic functions may comprise trigger code within the application form that may be executed in application server process 120 by data access and logic module 145 as user client 110 and/or test display target 135 interacts with the application. Method 200 may then advance to stage 220 where computing device 300 may store form definition 160 associated with the form. For example application server process 120 may create an instance of each of the control elements, labels, and/or functions associated with the form as specified by form definition 160. This definition may be used to build display-technology-agnostic, logical form 155 of the user interface for the logical client instances 140(A)-(B), which in turn may communicate with test display target 135 and/or multiple visual, user-accessible displays of the user interface for user clients 110. Application server process 120 may translate each of the plurality of control elements into a logical representation comprising an accessor method and at least one metadata element. Application server process 120 may then associate at least one of the plurality of control elements with at least one of the logic functions. Consistent with embodiments of the invention, the logical model may allow inspection of underlying metadata associated with form definition prior to, during, and/or after execution of the test case.

If a dependency relationship is derived between at least one first logical representation and at least one second logical representation, then application server process 120 may define a variable and/or data accessor method associated with the logical model of the user interface. For example, one form element may comprise a country selector. Another form element, such as a sub-region (e.g., state/province) may comprise a dependency relationship on the country selector such that only certain entries in the dependent form element may be considered valid according to the selection in the first form element. Upon receiving a data input to the country selector via test display target 135 and/or user client 110, sub-region data may be populated into the second form element from database 150.

Method 200 may then advance to stage 230 where computing device 300 may receive a test case associated with the user interface. For example, the test case may comprise a sequence of command statements such as text inputs and function calls associated with the form. Consistent with embodiments of the invention, the test case may further comprise validation commands, such as correct data to be compared to results of the execution of one and/or more of the command statements.

Method 200 may then advance to stage 240 where computing device 300 may execute the test case. For example, test display target 135 may execute each of the command statements in sequence and evaluate whether each of the sequence of command statements executed successfully. A command statement may comprise an input of login data for a sample user of the form. Test display target 135 may be operative to determine if the logical functions receive the data correctly and return appropriate information without necessitating actual input of the data into a visual representation of the form. Consistent with embodiments of the invention, computing device 300 may define an application programming interface (API) according to the form. Executing the command statements may comprise making calls to functions associated with the API.

Consistent with embodiments of the invention, the API exposed by Test Form Variable 180 may be said to be in accordance with form definition 160 if it matches the abstraction level of form definition 160. For example, a control on the form bound to a "date" type field may appear within the API as a single member with relevant high-level methods for date manipulation in the UI. This may differ from testing against physical form UI 115, where the individual low-level controls that make up the date field (e.g., three seemingly independent controls such a label, a textbox and a button) may be exposed. Test scripts against the physical UI may need to be written with the knowledge that these three controls may logically represent various parts of the same piece of data and that the textbox contains the date formatted as text while the button will open a date-picker. This knowledge, which may be required by testing approaches that go against the physical UI, compensates for the lack of a strong tie to the original level of abstraction of the form definition.

Method 200 may then advance to stage 250 where computing device 300 may provide a result of applying the test case to a user. For example, application server process 120, responsible for hosting the execution of the test code, may report success or failure based on the evaluation of the test case at stage 260 to one and/or more of plurality of user clients 110. Method 200 may then end at stage 280.

An embodiment consistent with the invention may comprise a system for providing a testing environment extension. The system may comprise a memory storage and a processing unit coupled to the memory storage. The processing unit may be operative to create an application within a modeling framework, wherein the application comprises at least one form, define at least one variable associated with the at least one form, create an application programming interface (API) according to the at least one form, apply a test case to the at least one variable, wherein applying the test case comprises making at least one call to the API, and report a result of applying the test case to a user.

Another embodiment consistent with the invention may comprise a system for providing a testing environment extension. The system may comprise a memory storage and a processing unit coupled to the memory storage. The processing unit may be operative to identify a plurality of control elements associated with a form, create a logical representation associated with each of the plurality of control elements, derive a relationship between at least one first logical representation and at least one second logical representation from the form, define a variable associated with the form, create an application programming interface (API) associated with the variable, apply a test case using the variable via the API, and provide a result of executing the test case to a user.

Yet another embodiment consistent with the invention may comprise a system for providing a testing environment extension. The system may comprise a memory storage and a processing unit coupled to the memory storage. The processing unit may be operative to create an application comprising a plurality of control elements associated with a form and a plurality of logic functions, store a definition associated with the form, translate at least one of the plurality of control elements into a logical representation comprising an accessor method and at least one metadata element, define an application programming interface (API) according to the logical representation, execute a test case associated with the user interface against the form definition, evaluate whether each of the sequence of command statements executed successfully, and provide a result of applying the test case to a user.

Figure 3:
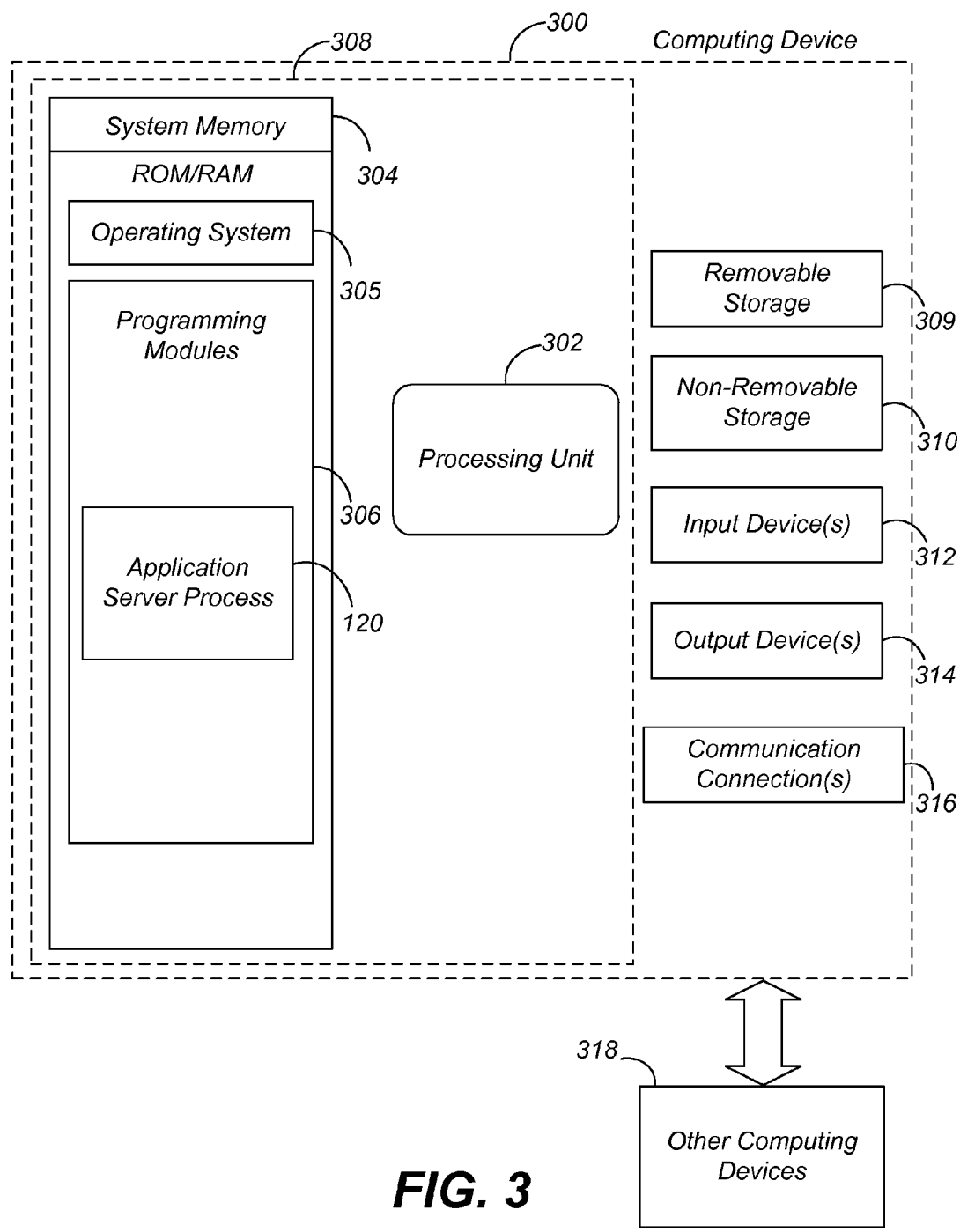
FIG. 3 is a block diagram of a system including a computing device.

FIG. 3 is a block diagram of a system including computing device 300. Consistent with an embodiment of the invention, the aforementioned memory storage and processing unit may be implemented in a computing device, such as computing device 300 of FIG. 3. Any suitable combination of hardware, software, or firmware may be used to implement the memory storage and processing unit. For example, the memory storage and processing unit may be implemented with computing device 300 or any of other computing devices 318, in combination with computing device 300. The aforementioned system, device, and processors are examples and other systems, devices, and processors may comprise the aforementioned memory storage and processing unit, consistent with embodiments of the invention. Furthermore, computing device 300 may comprise operating environment 100 as described above. Methods described in this specification may operate in other environments and are not limited to computing device 300.

With reference to FIG. 3, a system consistent with an embodiment of the invention may include a computing device, such as computing device 300. In a basic configuration, computing device 300 may include at least one processing unit 302 and a system memory 304. Depending on the configuration and type of computing device, system memory 304 may comprise, but is not limited to, volatile (e.g. random access memory (RAM)), non-volatile (e.g., read-only memory (ROM)), flash memory, or any combination. System memory 304 may include operating system 305, one or more programming modules 306, and may include application server process 120. Operating system 305, for example, may be suitable for controlling computing device 300's operation. In one embodiment, programming modules 306 may include application server process 120. Furthermore, embodiments of the invention may be practiced in conjunction with a graphics library, other operating systems, or any other application program and is not limited to any particular application or system. This basic configuration is illustrated in FIG. 3 by those components within a dashed line 308.

Computing device 300 may have additional features or functionality. For example, computing device 300 may also include additional data storage devices (removable and/or non-removable) such as, for example, magnetic disks, optical disks, or tape. Such additional storage is illustrated in FIG. 3 by a removable storage 309 and a non-removable storage 310. Computing device 300 may also contain a communication connection 316 that may allow device 300 to communicate with other computing devices 318, such as over a network in a distributed computing environment, for example, an intranet or the Internet. Communication connection 316 is one example of communication media.

The term computer readable media as used herein may include computer storage media. Computer storage media may include volatile and nonvolatile, removable and non-removable media implemented in any method or technology for storage of information, such as computer readable instructions, data structures, program modules, or other data. System memory 304, removable storage 309, and non-removable storage 310 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 300. Any such computer storage media may be part of device 300. Computing device 300 may also have input device(s) 312 such as a keyboard, a mouse, a pen, a sound input device, a touch input device, etc. Output device(s) 314 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

As stated above, a number of program modules and data files may be stored in system memory 304, including operating system 305. While executing on processing unit 302, programming modules 306 (e.g., application server process 120) may perform processes including, for example, one or more of method 200's stages as described above. The aforementioned process is an example, and processing unit 302 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A computer-implemented method for testing a user interface, the method comprising:
    storing a definition associated with a form of the user interface;
    identifying, based on the definition, a plurality of control elements and logic functions associated with the form;
    translating the plurality of control elements into a first logical representation;
    creating a logical form comprising an instance of the logic functions and the first logical representation of the plurality of control elements,
    wherein the logical form is an agnostic version of the form of the user interface;
    receiving a test case associated with a variable of the form;
    creating an application programming interface (API) for the logic functions, the creating including generating a 1:1 reflection of each element of the plurality of control elements;
    creating a non-visual test form comprising the instance of the logical form, the non-visual test form having access to the plurality of control elements and the logic functions through the logical form;
    making at least one call to the API based on the test case, wherein the at least one call corresponds to an abstraction level of the definition;
    evaluating the at least one call to the API using the non-visual test form, the evaluating of the at least one call to the API including:

evaluating an effect of providing input from the test case into the first logical representation of the plurality of control elements associated with the form, and evaluating an effect of providing the input to the first logical representation on a second logical representation of the form; and reporting a result of the evaluation of the at least one call to the API.

2. The method of claim 1, wherein executing the test case against the form comprises simulating at least one of a plurality of user interactions with the form.

3. The method of claim 2, wherein the at least one of the plurality of user interactions comprises at least one of the following:

entering data, selecting a menu item, activating a control of the form, submitting the form, and clearing the form.

4. The method of claim 2, wherein simulating the at least one of the plurality of user interactions comprises calling a function associated with the API.

5. The method of claim 4, wherein the function associated with the API is associated with the first logical representation of a control associated with the form.

6. The method of claim 1, further comprising:

validating the test case against the definition.

7. A system for testing a user interface, the system comprising:

a memory storage; and a processor coupled to the memory storage, wherein the processor is operative to:

identify a plurality of control elements and logic functions associated with a form, create a logical representation associated with the plurality of control elements, create a logical form comprising an instance of the logic functions and the logical representation of the plurality of control elements, wherein the logical form is an agnostic version of the form;

receive g a test case associated with a variable of the form;

create an application programming interface (API) for the logic functions, the creating including generating a 1:1 reflection of each element of the plurality of control elements;

create a non-visual test form comprising the instance of the logical form, the non-visual test form having access to the plurality of control elements and the logic functions through the logical form;

make at least one call to the API based on the test case, wherein the at least one call corresponds to an abstraction level of the definition;

evaluate the at least one call to the API using the non-visual test form, the evaluating of the at least one call to the API including:

evaluating an effect of providing input from the test case into a first logical representation of the plurality of control elements associated with the form, and evaluating an effect of providing the input to the first logical representation on a second logical representation of the form; and reporting a result of the evaluation of the at least one call to the API.

8. The system of claim 7, wherein the test case is executed within a server process associated with an application.

9. The system of claim 7, wherein the processor is further operative to filter out at least one of the plurality of control elements and wherein no logical representation is created for the filtered at least one of the plurality of control elements.

10. The system of claim 9, wherein the filtered at least one of the plurality of control elements comprises a non-actionable control element.

11. The system of claim 7, wherein each of the plurality of control elements comprises at least one metadata property.

12. The system of claim 7, wherein the test case comprises a sequence of command statements.

13. The system of claim 12, wherein being operative to execute the test case comprises being operative to:

execute each of the command statements in sequence against the non-visual test form, determine whether each of the command statements executed correctly, and in response to determining that at least one command statement did not execute correctly, halt execution of the test case.

14. The system of claim 13, wherein being operative to determine whether each of the command statements executed correctly comprises being operative to determine whether a correct data entry has been stored in a database.

15. The system of claim 14, wherein the processor is further operative to populate at least one control element according to data stored in the database in response to executing at least one of the command statements.

16. A memory which stores a set of instructions which when executed performs a method for testing a user interface, the method executed by the set of instructions comprising:

creating an application comprising a plurality of control elements and a plurality of logic functions associated with a form storing a definition associated with the form, wherein the definition is associated with providing at least one logical client accessible by at least one user client and at least one test display target;

translating the plurality of control elements into respective logical representation comprising an accessor method and at least one metadata element, creating a logical form comprising an instance of the plurality of logic functions and the logical representation of the plurality of control elements, wherein the logical form is an agnostic version of the form;

receiving a test case associated with a variable of the form;

creating an application programming interface (API) for the plurality of logic functions, the creating including generating a 1:1 reflection of each element of the plurality of control elements;

creating a non-visual test form comprising an instance of the logical form, the non-visual test form having access to the plurality of control elements and the plurality of logic functions through the logical form;

making at least one call to the API based on a test case, wherein the at least one call corresponds to an abstraction level of the definition;

evaluating the at least one call to the API using the non-visual test form, the evaluating of the at least one call to the API including:

evaluating an effect of providing input from the test case into a first logical representation of the plurality of control elements associated with the form, and evaluating an effect of providing the input to the first logical representation on a second logical representation of the form; and reporting a result of the evaluation of the at least one call to the API.

\* \* \* \* \*